June 7, 1949.  T. M. FAIRCHILD  2,472,655
BOTTOM FOR METALLURGICAL FURNACES
Filed Aug. 5, 1944
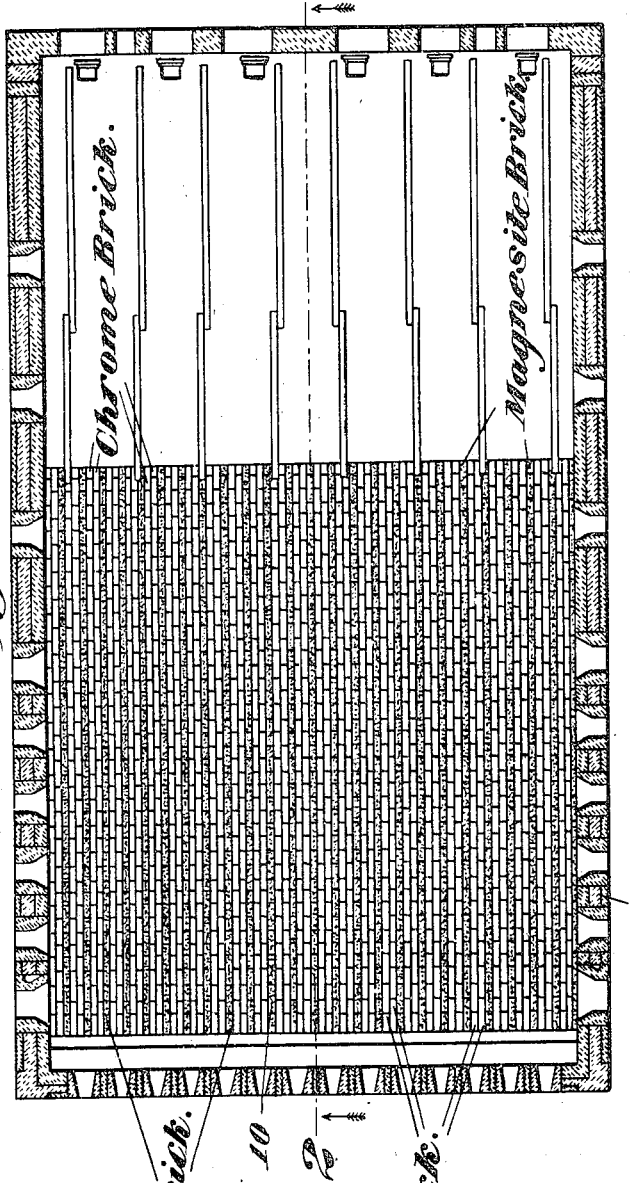
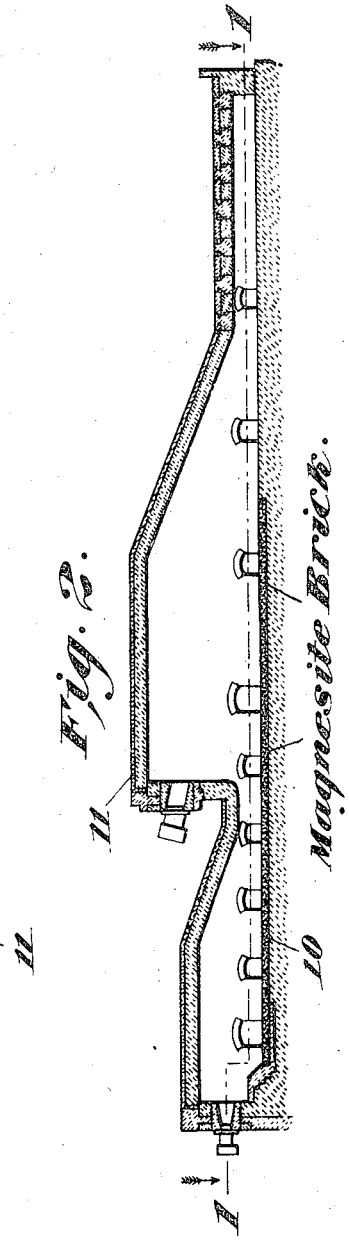
Inventor
Theodore M. Fairchild
By R. S. C. Dougherty
Attorney Patented June 7, 1949

2,472,655

UNITED STATES PATENT OFFICE 2,472,655

BOTTOM FOR METALLURGICAL FURNACES

Theodore M. Fairchild, Johnstown, Pa., assignor to Bethlehem Steel Company, a corporation of Pennsylvania Application August 5, 1944, Serial No. 548,305

1 Claim. (Cl. 266—43)

This invention relates to improvements in bottoms for metallurgical furnaces, and in particular to bottoms for furnaces utilized to heat billets or ingots prior to the forming of said billets or ingots into finished or semi-finished products by rolling or forging.

The several types of bottoms for furnaces of this type, which will be hereinafter referred to as heating furnaces, have heretofore been open to a number of objections.

One well known type of bottom that has been used is made of a plastic chrome refractory ramming material. This has given good results so far as wearing quality is concerned. However, this type of bottom requires several days to a week to install as it must be rammed in and sintered before it is ready for use. When maximum production is a primary consideration, this prolonged interruption of the operation of a furnace is most undesirable.

Bottoms have also been built of standard shape refractory bricks of either chrome or magnesite. While this type of bottom is cheaper than the plastic rammed bottom and can be installed in a very short time, both the chrome bottom and the magnesite bottom have certain objectionable characteristics. Thus, the chrome bottom tends to absorb the slag, cinder, etc. formed in the furnace from the scale on the billets or ingots and from other molten material from the walls or roof of the furnace. This results in a rapid fluxing away of the chrome brick, so that this type of bottom has a relatively short life.

Magnesite brick, on the other hand, while having a relatively long life, is objectionable in that the aforementioned slag etc. will accumulate and build up on the surface of the brick. This makes it difficult to push the billets through the furnace, and requires frequent interruptions of the furnace operation to remove the accumulated material from the furnace bottom.

I have discovered that if a bottom is formed of a combination of magnesite bricks and chrome bricks, it is possible to retain the advantages of the brick bottoms, namely, economy and speed of installation, while at the same time obtaining a furnace bottom with a longer uninterrupted useful life than is possible with either chrome or magnesite.

In the accompanying drawings which illustrate one embodiment of my invention,

Fig. 1 is a plan view, partly in section along the line 1—1 of Fig. 2, of the bottom and surrounding structure of a heating furnace; and Fig. 2 is a sectional view taken along the line 2—2 of Fig. 1.

In the bottom 10 of the furnace 11 illustrated I lay the bricks rowlock, that is, with one of the long, narrow faces of the brick exposed, and I alternate chrome brick with magnesite brick. While I do not wish my invention to be considered as limited to any particular combination of bricks, I have found in several installations that very satisfactory results are obtained with a bottom in which one row of magnesite brick alternates with two rows of chrome brick all the way across the bottom of the furnace as shown in the drawings. Furthermore a furnace bottom formed of alternate areas of hardened plastic refractory material of the kind used for the aforesaid brick elements is a structure made in accordance with my invention; it may be intercalated in rows, or areas of various contours, laid in situ or precast, without departing from the spirit of my invention.

In actual operation with a furnace bottom as described in the two preceding paragraphs, I find that a considerable proportion of the slag and cinder is absorbed by the chrome bricks, which are partially fluxed away thereby. The magnesite bricks, however, not being attacked by the slag, remain as skids along which the billets may be moved. The amount of slag which accumulates on the individual rows of magnesite brick has been found not to be objectionable, and does not materially affect the operation of the furnace.

Having thus described my invention, what I claim as new and desire to secure by Letters Patent is:

A bottom for a heating furnace having a surface comprising rows of chrome bricks alternating with rows of magnesite bricks.

THEODORE M. FAIRCHILD.

REFERENCES CITED

The following references are of record in the file of this patent:

UNITED STATES PATENTS

| Number | Name | Date |
|---|---|---|
| 367,251 | Swindell | July 26, 1887 |

OTHER REFERENCES

Industrial Furnaces, Vol. I, by W. Trinks, third edition, pages 261 and 262.

"Modern Furnace Technology," page 425 by H. Etherington.